US009001405B2

(12) United States Patent
Nerden

(10) Patent No.: US 9,001,405 B2
(45) Date of Patent: Apr. 7, 2015

(54) ACTUATING MECHANISM FOR A VIEWING PANEL

(75) Inventor: John D. Nerden, Hainault (GB)

(73) Assignee: Vistamatic Limited, Hainault (GB)

(*) Notice: Subject to any disclaimer, the term of this patent is extended or adjusted under 35 U.S.C. 154(b) by 216 days.

(21) Appl. No.: 13/501,504

(22) PCT Filed: Oct. 6, 2010

(86) PCT No.: PCT/GB2010/001871
§ 371 (c)(1), (2), (4) Date: Apr. 12, 2012

(87) PCT Pub. No.: WO2011/048354
PCT Pub. Date: Apr. 28, 2011

(65) Prior Publication Data

US 2012/0200904 A1 Aug. 9, 2012

(30) Foreign Application Priority Data

Oct. 22, 2009 (GB) .................................. 0918572.9

(51) Int. Cl.
*G02B 26/08* (2006.01)
*E06B 7/30* (2006.01)
*E06B 3/58* (2006.01)

(52) U.S. Cl.
CPC *E06B 7/30* (2013.01); *E06B 3/5892* (2013.01)

(58) Field of Classification Search
USPC ................................................. 359/227–236
See application file for complete search history.

(56) References Cited

U.S. PATENT DOCUMENTS 1,484,406 A 2/1924 Ottinger
5,164,856 A * 11/1992 Zhang et al. ............ 359/486.02

(Continued)

FOREIGN PATENT DOCUMENTS

GB 1296594 A 11/1972
GB 1459639 A 12/1976

(Continued)

OTHER PUBLICATIONS

International Search Report and Written Opinion for PCT/GB2010/001871, mailed Jul. 5, 2011; ISA/EP.

(Continued)

*Primary Examiner* — Jennifer L. Doak
(74) *Attorney, Agent, or Firm* — Harness, Dickey & Pierce, P.L.C.

(57) ABSTRACT

A viewing panel unit is disclosed, comprising: a first panel comprising one or more light transparent regions that are substantially transparent to visible light and one or more light hindering regions which substantially hinder transmission of visible light; a second panel comprising one or more light transparent regions that are substantially transparent to visible light and one or more light hindering regions which substantially hinder transmission of visible light; and an actuator (6) for moving the second panel relative to the first panel in a plane parallel to the plane of the first panel, wherein the actuator comprises: a cam (10) configured such that rotational movement of the cam causes linear movement of said second panel relative to said first panel; a shaft (8) extending through the cam; and an engaging member (15), wherein: the engaging member provides a non-rotatable connection between the shaft and the cam such that rotation of the shaft in use causes a corresponding rotation of said cam; the engaging member comprises an engaging portion that extends radially outwards from the shaft; and the engaging portion is axially encapsulated within the cam.

14 Claims, 5 Drawing Sheets

(56) References Cited

U.S. PATENT DOCUMENTS

| | | | | |
|---|---|---|---|---|
| 5,180,201 | A | 1/1993 | Hauber | |
| 5,940,216 | A | 8/1999 | Gibbs | |
| 2005/0007680 | A1 * | 1/2005 | Naganuma et al. | 359/704 |

FOREIGN PATENT DOCUMENTS

| | | | |
|---|---|---|---|
| GB | 1460259 | A | 12/1976 |
| GB | 2461347 | A | 1/2010 |
| WO | WO-2008/090298 | A1 | 7/2008 |

OTHER PUBLICATIONS

Search Report of the Intellectual Property Office (Great Britain) for priority application 0918572.9, dated Feb. 2, 2010.

* cited by examiner

ACTUATING MECHANISM FOR A VIEWING PANEL

CROSS-REFERENCE TO RELATED APPLICATIONS

This application is a 371 U.S. National Stage of International Application No. PCT/GB2010/001871, filed Oct. 6, 2010, and claims priority to British patent application No. 0918572.9, filed with the Intellectual Property Office on Oct. 22, 2009, the disclosures of which are herein incorporated by reference in their entirety.

The present invention relates to viewing panels with an optional through-vision facility.

Panels with an optional through-vision facility (i.e. panels that can be switched between a state in which they can be seen through and a state in which they cannot be seen through) are known. They can be used in hospital doors or windows to provide privacy for patients, for example. They can also be used in other areas that require privacy and/or security, for example in nursing homes, banks, offices, laboratories, post offices, nurseries and private residences.

GB 1296594 discloses an example of such a system comprising a pair of outer sheets secured in a rigid frame and a centre sheet slidably sandwiched between them. The centre sheet and one or both of the outer sheets have areas of reduced transparency, such that sliding movement of the centre sheet with respect to the outer sheets causes a variation in the extent to which it is possible to see through the panel. An actuator is provided to allow the centre sheet to be moved by turning a handle protruding to the outside.

The actuator described in GB 1296594 comprises a cam that is operable by a shaft extending through the outer sheets and carrying a handle at each end. The shaft has a square central portion which engages with the cam via a square-shaped hole in the cam.

It has been found that there is a tendency for the section of the shaft that fits in the square-shaped hole in the cam to strip the part of the cam with which it is fit, especially if the cam is formed of a low friction plastic material, such as nylon. To address the problem of stripping of the cam, GB 1460259 discloses an arrangement comprising a star shaped member having a non-rotatable fit with the shaft and which is configured to fit matingly into a star-shaped hole in the cam. However, it has been found that the star-shaped member can easily become misaligned with the star-shaped hole in the cam, for example during assembly or due to an impact, such that the plane of the protrusions of the star-shaped member no longer lie parallel to the plane of the cam. Such a misalignment can cause the star-shaped member to come away from the cam during use, especially where the load on the cam is high. The misalignment can also lead to the cam being stripped away by the star-shaped member due to uneven forces being applied to the edge of the hole.

A further problem is the possibility of the star-shaped member popping out of the cam due to impacts, caused for example by the centre sheet being lowered at high speed, or during transit of the viewing panel.

From a manufacturing point of view, it is also relatively difficult to assemble the star-shaped member into the cam with the required alignment and position tolerances.

It is an aim of the present invention to provide a viewing panel unit with an actuator which at least partially overcomes the above-mentioned problems with the prior art.

According to an aspect of the invention, there is provided a viewing panel unit, comprising: a first panel comprising one or more light transparent regions that are substantially transparent to visible light and one or more light hindering regions which substantially hinder transmission of visible light; a second panel comprising one or more light transparent regions that are substantially transparent to visible light and one or more light hindering regions which substantially hinder transmission of visible light; and an actuator for moving the second panel relative to the first panel in a plane parallel to the plane of the first panel, wherein the actuator comprises: a cam configured such that rotational movement of the cam causes linear movement of said second panel relative to said first panel; a shaft extending through the cam; and an engaging member, wherein: the engaging member providing a non-rotatable connection between the shaft and the cam such that rotation of the shaft in use causes a corresponding rotation of said cam, wherein: the engaging member comprises an engaging portion that extends radially outwards from the shaft; and the engaging portion is axially encapsulated within the cam.

Axially encapsulating the engaging member within the cam provides a more reliable and durable viewing panel unit. The axial encapsulation effectively prevents inadvertent disengagement of the engaging member from the cam. It also enables the engaging member to be accurately aligned relative to the cam, without requiring complex and/or precise assembly steps. Furthermore, the axial encapsulation enhances structural strength without requiring a corresponding increase in bulk and/or weight of the components involved, allowing the actuator to remain compact while being able to move larger and heavier panels and/or improving longevity.

Encapsulating the engaging member also allows for a more efficient manufacturing process of the viewing panel unit as, compared with the prior art, there is a reduction in the number of parts required to assemble the viewing panel unit.

The engaging portion of the viewing panel unit may comprise a circumferentially or axially non-uniform protrusion that extends into the cam.

The protrusion improves grip between the engaging member and the cam, which reduces the possibility of the engaging member damaging the cam and/or slipping relative to the cam when a load is applied. The improved grip enables the actuator to move larger and/or heavier panels and improves reliability and/or longevity.

The engaging portion may comprise a protrusion that is substantially parallel to the plane of the cam.

The cam may be relatively thin in one direction and is generally planar. A protrusion that is substantially parallel to the plane of the cam can be encapsulated more efficiently within the cam; the encapsulation thickness in the axial direction can be kept constant. Protrusions that extend further radially may also help achieve greater leverage.

The engaging portion may comprise a protrusion that is substantially perpendicular to the plane of the cam. This approach is advantageous because there is a greater surface area available for providing such protrusions compared to the case where the protrusions are provided parallel to the plane. A larger number of protrusions (and/or bigger protrusions) may therefore be provided.

The engaging member may comprise a protrusion that is substantially triangular.

A triangular protrusion is easily manufactured and provides efficient gripping. When the triangular shape has mirror symmetry about a radial axis, the maximum torque sustainable will be the same for rotations in both directions (i.e. clockwise and anticlockwise about the axis of the shaft).

The protrusion may be configured such that the maximum torque sustainable between the engaging member and the cam is greater in respect of rotations about the cam axis in one sense than in respect of rotations about the cam axis in the opposite sense.

This arrangement may be advantageous, for example, where the viewing panel is deployed vertically because the weight of the centre panel will always lead to a torque between the engaging member and the cam in the same sense (i.e. it will resist turning of the cam in the sense that causes lifting of the centre panel). Even when the centre panel is being lowered, in order for this to be carried out in a controlled fashion a small torque may still need to be applied in the direction that would lift the panel to avoid excessive acceleration of the centre panel.

The protrusion may be asymmetric. An asymmetric protrusion constitutes a simple and efficient way of providing a gripping force/torque between the engaging member and the shaft that is greater in one direction than the opposite direction.

The protrusion may be ratchet-tooth shaped. A ratchet-tooth shaped protrusion can have a curved slope on one edge and a steeper curved slope on the other edge.

The engaging member can comprise a plurality of protrusions, which further improve grip between the engaging member and the cam.

An engaging member with more than one protrusion can provide an increased gripping force than a single protrusion due to a larger contact area. The engaging member may comprise any number and any combination of the protrusions described above. For example, the engaging member may comprise protrusions that are substantially parallel to the plane of the cam and protrusions that are substantially perpendicular to the plane of the cam. Furthermore, the engaging member may comprise parallel protrusions that have perpendicular protrusions (or protrusions at any other angle) emanating from them (or vice versa).

The cam may also comprise at least one collar that fits around the shaft, wherein the collar can fit into a perforation in the first panel so as to limit movement of the cam within the plane parallel to the plane of the first panel and prevent axial tilt of the cam.

The collar provides greater stability between the cam and the shaft. The collar fits around the shaft such that the cam is unable to tilt away from the plane perpendicular to length of the shaft. The collar also provides greater stability between the cam and the first and second panel. The collar can also fit around a perforation in the first or third panel so as to limit tilting of the shaft and the cam.

The collar may be formed so as to be integral with the cam, thus facilitating assembly by reducing the number of individual assembly and/or alignment steps. Accurate alignment between the shaft and the panels can be achieved efficiently and will be resistant to shocks caused in use or during transport.

The cam may be arranged such that there is a non-linear relationship between the angular displacement of the shaft and the relative movement between the first and second panels. This arrangement may facilitate obtaining a desired non-linear light transmittance response.

The shaft may pass through the first panel and cooperate with a handle to facilitate manual rotation of the shaft by a user. Actuation may also be achieved by twisting a knob. The amount that the second panel moves relative to the first panel in response to actuation may be referred to as the degree of actuation. Typically, there will be a linear relationship between the actuating movement (e.g. the angle through which the handle or knob has been rotated) and the degree of actuation; in other words, the amount of movement of the second panel will be directly proportional to amount of movement of the actuator.

The cam may be made from a plastic such as polyoxymethylene (POM). POM has many desirable properties. POM is lightweight, stable, stiff and a low friction material. The low friction property allows the panel to slide easily along the surface of the cam, thus reducing the force required for actuation. POM can also easily be formed into the shape of a cam by applying heat and pressure.

The engaging member and/or shaft can be made from metal.

The cam can be formed by pressure moulding. The pressure moulding process can also include inserting at least the engaging member within a cam mould cavity and injecting molten cam material into the cam mould cavity.

Embodiments of the invention will now be described, by way of example only, with reference to the accompanying schematic drawings in which corresponding reference symbols indicate corresponding parts, and in which.

Figure 1:
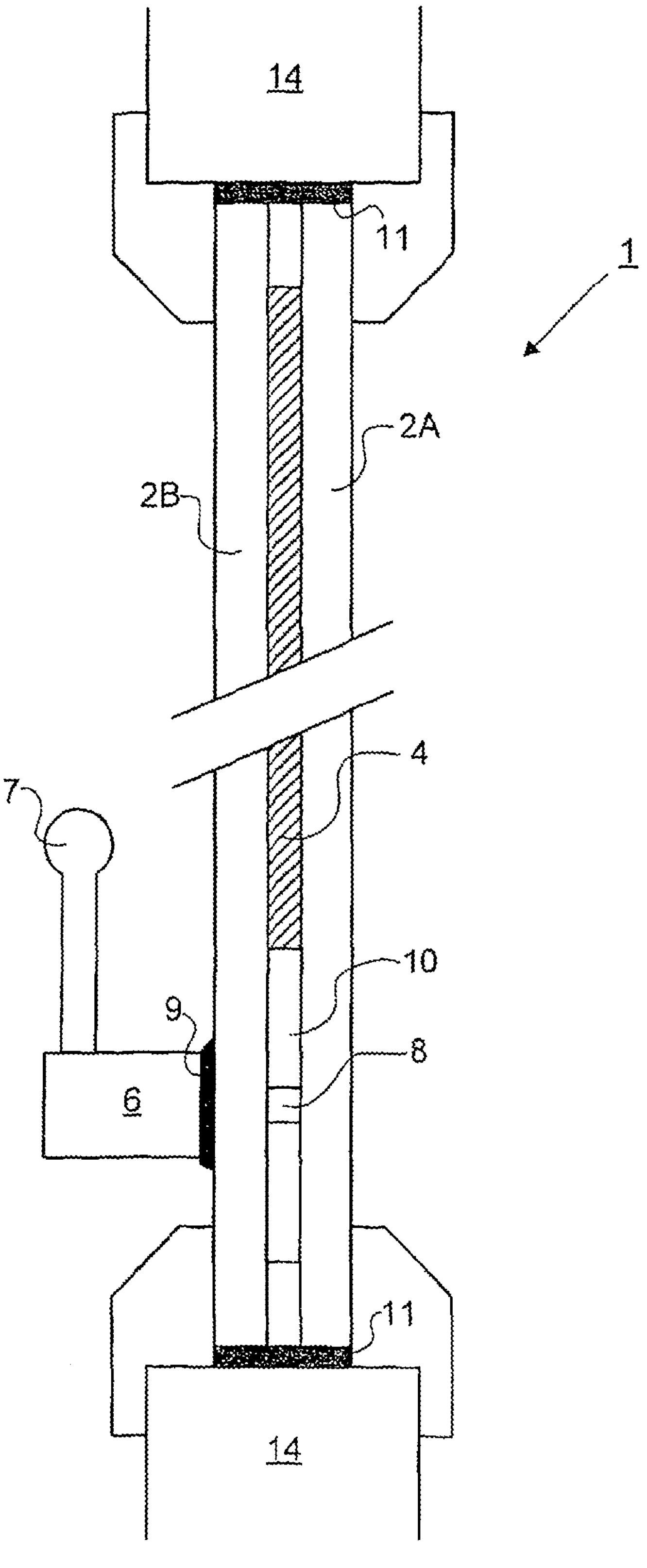
FIG. 1 is a sectional view of a viewing panel unit according to an embodiment of the invention, fitted into a frame.

FIG. 1 depicts in section a domestic viewing panel unit 1 fitted within a frame 14. The frame 14 may form part of an entrance door, for example, with the panel unit 1 serving as an actuatable peephole. The panel unit 1 shown comprises first and third panels 2A and 2B, one or both of which may be formed from glass (or other suitable transparent material) that can been reinforced to provide security. The thickness and/or strength of the reinforced glass may be chosen according to the context and expected requirements. Safety glass of 6-7 mm thickness may be used for the first and third panels 2A and 2B, for example. A second panel 4 is provided between the first and third panels 2A and 2B and is movable relative thereto (for example, up and down and/or side to side, into and out of the page). The second panel 4 may be formed from annealed glass, for example, of a thickness of about 4 mm.

In the example shown, it is envisaged that the second panel 4 should be moveable vertically relative to the first and third panels 2A/B and the frame 14 which is rigidly connected to the first and third panels 2A/B. An actuator 6 is provided to allow a user to control the movement of the second panel 4. In the example shown, the actuator 6 comprises a handle 7 which facilitates rotation of the actuator 6. The actuator 6 comprises a shaft portion 8, which penetrates through the third panel 2B into the region between the first and third panels 2A/B and beneath the second panel 4. The distal end of the shaft portion 8 (the end between the first and third panels 2A/B) cooperates with a cam 10 (i.e. connects thereto in such a way that rotation of the shaft 8 causes rotation of the cam 10). The cam 10 is shaped so as to transform rotational motion of the shaft 8 into linear motion (up and down in the example shown) of the second panel 4. A band may be provided in a lower portion of either or both of the first and third panels 2A/B so that the motion of the cam 10 is not visible from outside the panel unit 1. The panel unit 1 may form a "sealed unit" by means of end members 11 and seal 9.

One or more spacer bars (not shown) may be included to space the second panel 4 apart slightly from the first and/or third panels 2A/B. The cam 10 may have a thickness of around 4-6 mm.

Figure 2:
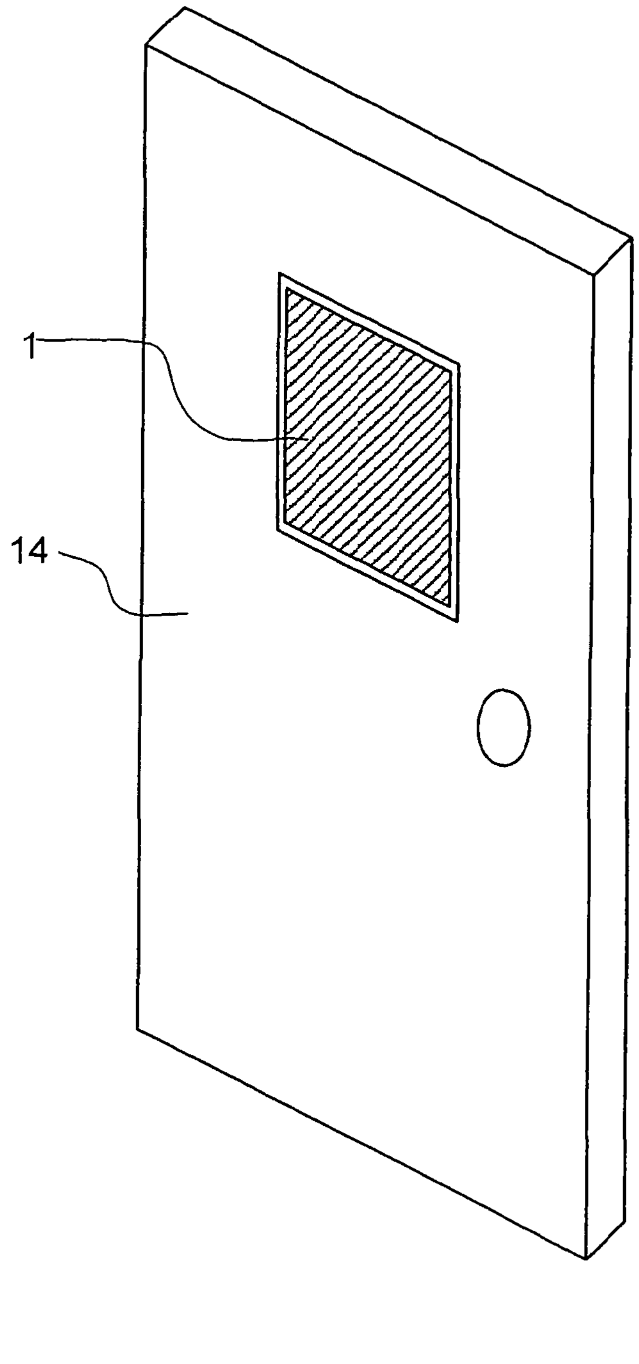
FIG. 2 depicts an entrance door fitted with a domestic viewing panel unit.

FIG. 2 depicts the panel unit 1 installed in an entrance door 14.

In order to vary the amount of light which is transmitted unhindered through the panel unit 1, the second panel 4 and one or both of the first and third panels 2A/B are provided with patterns on their surface or within the material of the panels. The patterns consist of regions which are basically transparent (like plain glass) and regions that hinder the passage of light through them, for example by reflecting, scattering and/or bending (refracting) a significant proportion of the incident light. The hindering regions are such that it would be difficult or impossible for a typical user to see a clear image through them. Similar hindering materials can be found in glass panes for bathrooms or toilets, for example, which comprise regions of uneven thickness (which causes image distortion by refraction) and/or frosting (which causes image distortion or clouding by scattering).

The degree to which a user is able to see properly through the panel unit 1 will depend on the extent to which transparent regions on the first and third panels 2A/B line up (or overlap) with transparent regions on the second panel 4. This is controlled by the degree of actuation of the actuator 6 (i.e. the distance that the second panel 4 has been moved by the actuator 6, which may be directly proportional to (the angle through which the shaft 8 of the actuator 6 has turned, for example) and will depend also on the details of the patterns formed in/on the first 2A, second 4 and/or third 2B panels.

Figure 3:
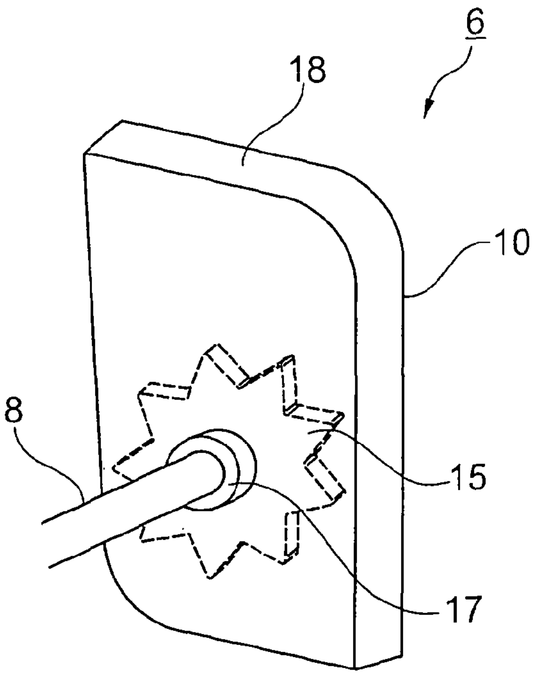
FIG. 3 depicts an actuator according to an embodiment of the present invention.

FIG. 3 shows an example of an actuator 6 comprising a cam 10 that is arranged to provide a non-linear relationship between the angular displacement of the shaft 8 and the relative movement between the first and second panels 2A and 4 respectively. The non-linear relationship is obtained by means of the curved upper surface 18 of the cam 10, which engages with the lower extremity of the second panel 4 in order to move it up and down. The cam 10 could also be configured to provide a linear relationship between the angular displacement of the shaft 8 and the relative movement between the first and second panels 2A and 4.

The shaft 8 engages with the cam 10 via an engaging member 15. The engaging member 15 has a non-rotatable fit with the shaft 8. The shaft 8 and engaging member 15 can be formed from a metal. The shaft 8 and the engaging member 15 may be formed as individual pieces that can be secured to each other by welding or gluing or otherwise. Alternatively, the shaft 8 and the engaging member 15 can be formed as a single piece, for example by casting and/or machining.

As shown in FIG. 3, the engaging member 15 and a portion of the shaft are encapsulated within the cam 10 (the encapsulated components are depicted by broken lines). The encapsulation fixes the engaging member 15 within the cam, providing a non-rotatable connection between the shaft 8 and the cam 10.

Figure 4:
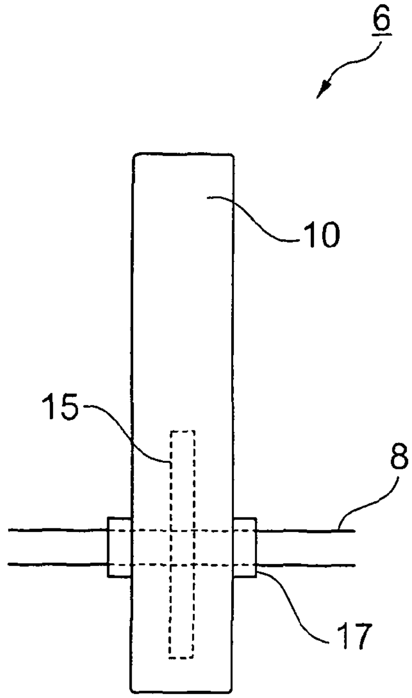
FIG. 4 depicts a side view of the of the actuator shown in FIG. 3.

FIG. 4 depicts a side view of the actuator shown in FIG. 3. The engaging member 15 is encapsulated both radially and axially within the cam 10 in this example. In other words, the engaging member 15 is completely surrounded by the encapsulation material in all directions parallel to the axis of the shaft 8 (axial encapsulation) and in all directions perpendicular to the axis of the shaft 8 (radial encapsulation). The engaging member 15 is generally planar and orientated perpendicular to the shaft axis; the thickness of the engaging member 15 in the axial direction is less than the thickness of the cam 10 in this direction. Preferably, the thickness of the cam 10 either side of the engaging member 15 is substantially equal. It is not possible for the engaging member 15 to move relative to the cam 10. This overcomes the problems associated with known actuators, such as the engaging member coming away from the cam, due to external shocks and the like. Furthermore, as the engaging member 15 is embedded within the cam 10, the actuator 6 has greater structural strength and is thus able to move larger and/or heavier panels.

Tilting of the plane of the cam 10 in a direction away from the plane parallel to the first panel 2A may lead to the edge of the upper surface of the cam 10 coming into contact with the second panel 4 rather than the flat upper surface 18. This may cause the second panel 4 to be raised to a height that is greater than a required height, causing the hindering regions on the first and third panels 2A/B to misalign with hindering regions on the second panel 4. A collar 17 that fits around the shaft can be provided to solve this problem. The collar 17 can fit into a perforation in the first panel 2A so as to limit movement of the plane of the cam 10 away from the plane parallel to the plane of the first panel 2A. This helps ensure that the cam 10 only rotates within the plane parallel to the first panel 2A. A second collar can also be provided that can fit into a perforation in the third panel 2B. The collar(s) and the cam 10 may be formed as a single piece or individual pieces that are secured together.

Figure 5:
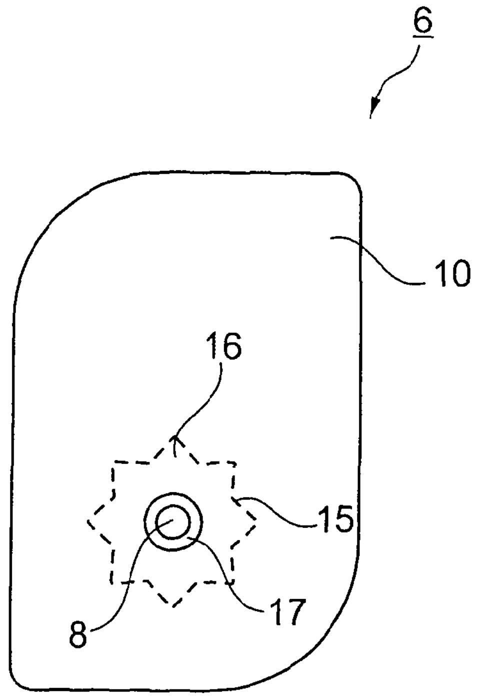
FIG. 5 depicts a front view of the actuator shown in FIG. 3.

FIG. 5 shows a front view of the actuator 6. The embedded engaging member 15 (depicted by broken lines) can have one or more protrusions 16. The protrusions 16 can be triangular, with mirror symmetry along radial axes, which can give the engaging member 15 a star shape. The protrusions 16 help the engaging member 15 to grip the cam 10 when the shaft 8 turns. It is desirable to provide a large gripping area and/or orient the gripping area so as to be oblique to the circumferential direction. The gripping area can be defined as the contact area between the surface of the engaging member 15 that is perpendicular to the direction of the rotation of the cam 10 and the cam 10 itself. A more effective gripping area can be achieved, for example, by increasing the thickness of the engaging member 15. However, this may lead to a reduction in the thickness of the cam material either side of the engaging member 15. This may be undesirable as a thinning of the cam material either side of the engaging member 15 may reduce the structural strength of the cam 10. It could also lead to the engaging member 15 breaking through the cam 10.

Figure 6:
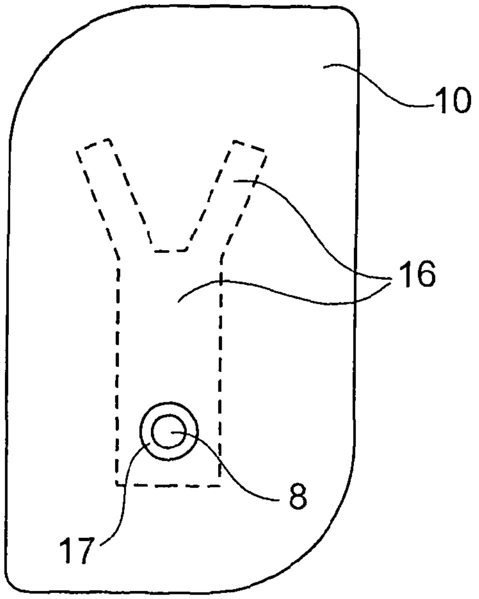
FIG. 6 depicts an actuator with a elongated protrusion.

The protrusion or protrusions are not limited to a triangular shape. The protrusions 16 can be of any shape that helps increase the maximum torque that can be sustained between the engaging member and the cam. FIG. 6 shows an alternative arrangement in which protrusions 16 are arranged to extend further into the cam 10.

Figure 7:
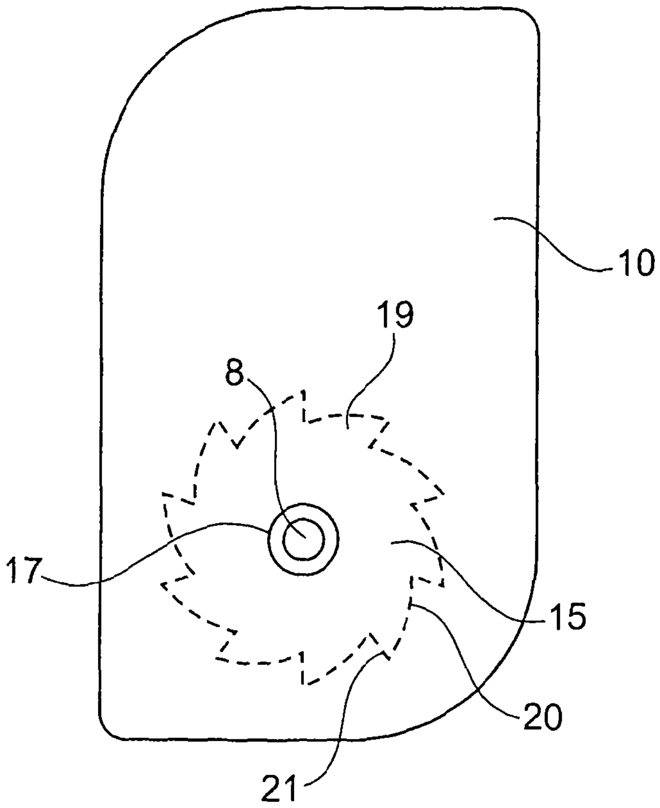
FIG. 7 depicts an engaging member with ratchet-tooth shaped protrusions.

FIG. 7 shows an engaging member 15 with ratchet-tooth shaped protrusions 19. The protrusions 19 are uniform but asymmetrical, each protrusion 19 having a first edge 20 with a moderately curved slope and a second edge 21 with a much steeper curved slope 21. Alternatively, the second edge can be substantially straight. Preferably, the first edge 20 is angled away from the radial axis of the shaft 8 and towards the direction of actuation where a greater force is required. Preferably, the second edge 21 has an angle that is greater than or equal to 0° from the radial line of the shaft 8 and less than the angle of the first edge from the radial axis of the shaft 8.

This provides an engaging member 15 that is capable of sustaining a greater gripping force or torque when the shaft 8 is turned towards the direction that the tip of the protrusion 19 is pointed (i.e the clockwise direction in FIG. 7) than the gripping force when the shaft 8 is turned in the opposite direction (i.e. the anticlockwise direction in FIG. 7).

In the examples shown above, the protrusions 8 of the engaging member 15 are parallel to the plane of the cam 10. Protrusions that are perpendicular to the plane of the cam 10 can also be utilised. The perpendicular protrusions can also be formed on the parallel protrusions; for example, the triangular protrusions described above can be modified to form a pyramid or bipyramird shape.

The cam 10 may be formed from plastic. Preferably, the cam 10 is formed from POM. POM has many desirable properties such as high stability and stiffness, low friction and low density. The low friction property allows the panel to slide easily along the surface of the POM cam. Thus the low friction and lightweight properties reduces the force required to be applied by the user to turn the cam. POM can also easily be formed into the shape of a cam.

The actuator can be manufactured by pressure moulding. The cam can be manufactured by providing a mould cavity that is capable of fitting around the shaft and engaging member such that the injection of molten cam material into the cavity causes the cam material completely surround the engaging member and partially surround the shaft. The collar may also be formed by providing a cast that partially surrounds the shaft.

The invention claimed is:

1. . A viewing panel unit, comprising:

a first panel comprising one or more light transparent regions that are substantially transparent to visible light and one or more light hindering regions which substantially hinder transmission of visible light;

a second panel comprising one or more light transparent regions that are substantially transparent to visible light and one or more light hindering regions which substantially hinder transmission of visible light; and an actuator for moving the second panel relative to the first panel in a plane parallel to the plane of the first panel, wherein the actuator comprises:

a cam configured such that rotational movement of the cam causes linear movement of said second panel relative to said first panel;

a shaft extending through the cam; and an engaging member, wherein:

the engaging member provides a non-rotatable connection between the shaft and the cam such that rotation of the shaft in use causes a corresponding rotation of the cam;

the engaging member comprises an engaging portion that extends radially outwards from the shaft; and the engaging portion is surrounded by the cam in all directions parallel to the axis of the shaft and in all directions perpendicular to the axis of the shaft.

2. The viewing panel unit according to claim 1, wherein the engaging portion comprises a circumferentially or axially non-uniform protrusion that extends into the cam.

3. The viewing panel unit according to claim 2, wherein the protrusion is substantially parallel to the plane of the cam.

4. The viewing panel unit according to claim 2, wherein the protrusion is substantially perpendicular to the plane of the cam.

5. The viewing panel unit according to claim 2, wherein the protrusion is substantially triangular with a radial axis of mirror symmetry.

6. The viewing panel unit according to claim 2, wherein the protrusion is configured such that a maximum torque sustainable between said engaging member and said cam is greater in respect of rotations about a cam axis in one direction than in respect of rotations about the cam axis in an opposite direction.

7. The viewing panel unit according to claim 6, wherein the protrusion is asymmetric.

8. The viewing panel unit according to claim 6, wherein the protrusion is ratchet-tooth shaped.

9. The viewing panel unit according to claim 2, wherein the engaging member comprises a plurality of protrusions.

10. The viewing panel unit according to claim 1, wherein the cam comprises at least one collar that fits around the shaft and wherein the collar fits into a hole in the first panel so as to limit movement of the cam within the plane parallel to the plane of the first panel and prevent axial tilt of the cam.

11. The viewing panel unit according to claim 1, wherein the cam is made from polyoxymethylene.

12. The viewing panel unit according to claim 1, wherein the engaging member and/or shaft is made from metal.

13. The viewing panel unit according to claim 1, wherein the cam is formed by pressure moulding.

14. The viewing panel unit according to claim 1, wherein the cam is formed by inserting at least the engaging member within a cam mould cavity and injecting molten cam material into the cam mould cavity.

* * * * *